June 24, 1969
A. J. SHUTTLE, JR
3,451,136
METHOD OF AND MEANS FOR DETERMINING LINE AND GRADE OF
SEWER PIPES AND THE LIKE
Filed Feb. 10, 1967
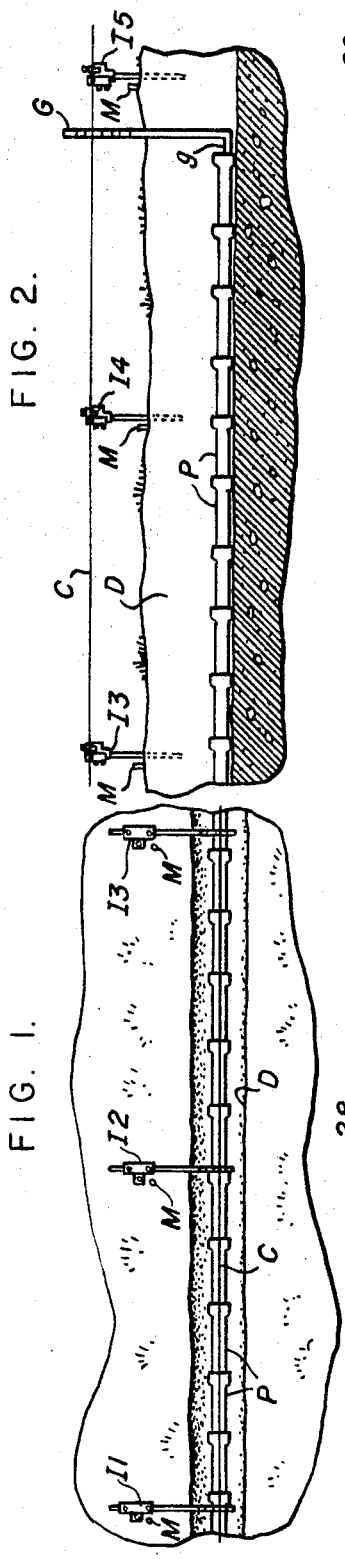
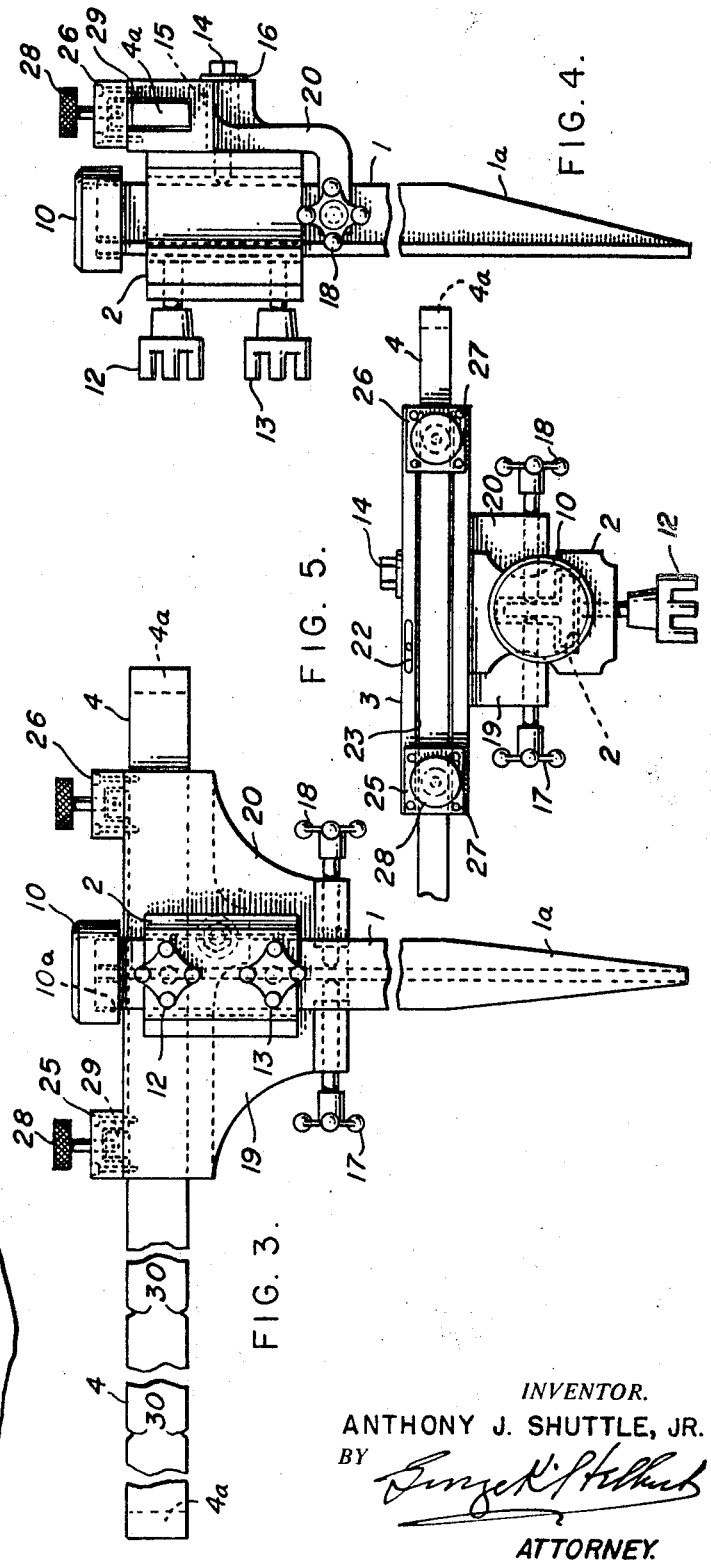
INVENTOR.
ANTHONY J. SHUTTLE, JR.
BY
ATTORNEY.

United States Patent Office 3,451,136
Patented June 24, 1969

3,451,136
METHOD OF AND MEANS FOR DETERMINING LINE AND GRADE OF SEWER PIPES AND THE LIKE
Anthony J. Shuttle, Jr., 839 Rydal Road, Jenkintown, Pa. 19046
Filed Feb. 10, 1967, Ser. No. 615,193
Int. Cl. G01c 15/00
U.S. Cl. 33—1                                                                            4 Claims

ABSTRACT OF THE DISCLOSURE

Apparatus for locating an imaginary flow-line in a trench to facilitate the placing of pipes in the construction of underground pipe lines or the like, comprising an upstanding support, a body movable thereon carrying a bar slidable on and projecting from the body adapted when the body is disposed adjacent the trench to extend thereover, said body having an indexing point for measurement therefrom downwardly to a point in the trench coincident with the flow-line, and a method of utilizing said apparatus.

*Background of the invention*

Gravity flow pipe lines and other elongated structures, including storm and sanitary sewer lines, water mains and those of similar character as distinguished from high pressure oil and gas pipe lines and the like, are normally related to the surrounding terrain in such manner as to dispose the structure in predetermined relation to an imaginary line frequently having a prescribed usually relatively small angle to the horizontal.

In laying such lines, it is the general practice to locate this imaginary line known as the "flow-line" at a fairly constant angle to the horizontal between adjacent manholes, usually spaced apart at intervals of 80′–400′, and thence outwardly from each such manhole to other respectively adjacent ones either at the same or at different angles depending on the terrain, relative elevations of the terminals and the like.

The preliminary work, which precedes the actual laying in a trench of the pipe sections destined to become components of a pipe line of the character described includes the making of a survey during which stakes or other reasonably durable and fixed indicia or markers are erected to provide reference points not only for establishing the course to be followed by the trench, but also for use in locating the flow-line of the pipes ultimately to be laid therein. Usually these reference points are offset to one side of the trench location and are normally spaced at intervals of approximately 25′, or up to 50′ where the angle to the horizontal of the flow-line is relatively large; they define a line generally parallel to but at an elevation higher than and laterally offset from the projected flow-line, the differences in elevation and offset distances of the respective points being recorded on a separate sheet.

The data thus compiled is turned over first to the trench digging crew which uses it to locate and then dig the trench in which the pipe line is to be laid, and then, in turn, to the pipe-laying crew which does the actual work of progressively assembling the pipe sections in the trench in accordance with the imaginary flow-line, the apparatus of my invention being for use primarily by the latter crew.

*Summary of the invention*

More particularly the present invention contemplates provision of an apparatus or an instrument which when cooperatively disposed in spaced relation with other like instruments along and adjacent the course of a projected pipe line and with said other like instruments properly adjusted in relation to previously determined and duly recorded reference points provides one of a plurality of supports for a cord or other elongated relatively weightless element, paralleling and vertically offset a predetermined distance above the imaginary line corresponding to the desired flow-line for use as a continuous line of reference for progressively connecting the pipe sections in the trench below said element in proper relation to the projected flow-line of the completed pipe line structure.

Another object of the invention is to provide a series of steps comprising a novel method for locating by relating it to a series of reference points a flow-line defined and identified by a relatively weightless elongated element spaced therefrom whereby on successive measurements of a predetermined distance from said element the position of the flow-line can be determined.

Heretofore it has been customary to locate a secondary point of reference on the side of the trench opposite each primary point established by the survey crew and to extend a board or the like across the trench at each such pair of points or else to mount a board on uprights projecting from and above the trench proximate each primary point, then to drive nails into these boards laterally offset the proper distance from the primary points to which they are related and to stretch a cord between the nails to simulate the lateral disposition of the flow-line. The proper position of the successive pipe sections as each is thereafter laid in the trench is then determined from the reference data and appropriate measurement vertically from the cord by use of a grade pole, hereinafter more fully described; the operations needed to thus locate the flow-line require the services of several operatives working conjointly.

The novel instrument of my invention provides one of a plurality of supports for such cord or the like for maintaining it vertically offset from a previously defined but imaginary flow-line in an adjacent trench whereby on measurement from said cord the components of a pipe line or the like may be accurately disposed in respect to said flow-line.

As and for a further disclosure of the nature of the invention there will now be described, with reference to the accompanying drawing a preferred embodiment of such apparatus or instrument useful primarily in carrying out the steps constituting the method contemplated by the invention and hence illustrative of the best presently known mode of practicing it and realizing the purposes and objects thereof which will more fully appear as this disclosure proceeds.

*Brief description of the drawing*

FIG. 1 is a fragmentary top plan view of the scene of a pipe line laying operation during construction of the line and after a plurality of pipe sections have been laid in longitudinally aligned and interconnecting relation in a trench which later will be backfilled with soil or the like;

FIG. 2 is a fragmentary vertical section on the trench and partially completed pipe line but farther along the trench than FIG. 1 and it has not yet received all the pipe sections to be laid in it, this view being taken as rotated 90° about the line defining the axis of the pipes laid and to be laid in the trench;

FIG. 3, on a scale greatly enlarged on that of the preceding figures, is a side elevation of said preferred embodiment of the invention;

FIG. 4 is a fragmentary end elevation thereof, and

FIG. 5 is a fragmentary top plan view of it.

More particularly, the apparatus illustrated in the drawing will first be described with reference to its structure, and its operation and utility to the extent necessary will then be brought out in greater detail.

Description of the preferred embodiment

Specifically, the said preferred embodiment comprises in essence four cooperative components designated in general stake 1, supporting the other components including a body 2 receiving stake 1 to which it may be clamped and a bar holder 3 pivotally carried by the body and adapted for angular adjustment about its pivotal connection therewith, the holder in turn supporting the fourth component, offset bar 4, preferably tubular and of rectangular cross section, having its ends closed by suitable plugs 4a to exclude entry of foreign matter.

In further detail stake 1 comprises preferably a steel bar of T-section having a pointed lower end which facilitates its being driven into the ground, usually at a point closely adjacent a marker M exhibiting a reference point adjacent a pipe line trench, and as an accessory a removable cup shaped steel driving cap 10 having a recess 10a receiving the other end of the stake to enable the stake to be driven into the ground without deforming its end from repeated blows directly thereon.

The body 2 is adjustable vertically of the stake and receives the latter in a T-shaped passage 2a into which manually operable clamping screws 12, 13 threaded into the body project for engagement with the stake to secure the body thereto at any desired elevation above the grade after the stake has been driven into the ground. The body can of course be placed on the stake either before or after the latter has been set, but preferably afterward to avert possible damage thereto from missed hammer blows directed at driving cap 10.

A cap screw 14 threaded into body 1 extending through a bushing 15 in bar holder 3 and carrying a washer 16 under its head provides the pivotal connection between the holder and body while opposed adjusting screws 17, 18 are threaded into arms 19, 20 respectively which together constitute an integral depending yoke embracing the web of stake 1 to enable adjustment of the angular relation of the bar holder with respect to the body; upon a desired adjustment being attained these screws may be utilized in cooperation with cap screw 14 to releasably lock the bar holder in fixed relation to the body, most conveniently with the upper edges of the latter precisely horizontal as may readily be determined by reference to a spirit level 22 desirably permanently attached to the bar holder. The holder receives offset bar 4 in a slot or way 23 the bottom of which is parallel to the upper edges of the holder so that when the bar is fixed therein and the holder locked in horizontal position the bar also extends exactly horizontally; the importance of this horizontality will hereinafter more fully appear.

For locking bar 4 in way 23 blocks 25, 26 bridge the latter and are secured to the bar holder by screws 27, knurled set screws 28 carrying nylon or other suitable friction disks 29 at their lower ends enabling the bar to be clamped in the way after adjustment longitudinally therein with the disks backed out.

Inwardly from one end of the bar are vertically opposed pairs of notches 30 spaced apart at suitable intervals, conveniently one foot in length, for reception of a cord or the like and, particularly when the cord is wrapped about the bar so as to lie in both of a pair of the notches, to hold the cord in fixed relation to the bar and permit its use as a line of reference for locating a flow-line.

While some mention has been made of the functions of certain of the components of the apparatus above described, its utility for facilitating the loction of a flow-line will be perhaps mare fully understood from the following explanation of the procedure I have devised for realizing its capacities and potentialities to best advantage.

This procedure involves no departure from the established method of fixing at the side of the pipe line to be laid a succession of reference points, and designating on a data sheet or table their respective distances both laterally and vertically from the desired flow-line.

The distances are generally expressed in feet, inches and fractions of inches, or in feet and hundredths of a foot and in practice reference points are but rarely located a whole number of feet above the flow-line. However, in the field it is most convenient to locate the flow-line of a pipe in terms of whole numbers of feet from a reference point so in setting up my instrument stake 1 is therefore driven into the ground as closely as possible to the marker M on which the point is displayed and body 2 is then adjusted vertically on the stake so the upper edge of bar holder 3 after leveling is a whole number of feet above the desired flow-line. Thus if the data supplied indicates, for example, the reference point on marker M is 6.07′ above said flow-line, the upper edge of the leveled bar holder may be located, say 1.93′ above the reference point, and hence an even 8′ about the flow-line. Likewise, the plane of the bar being properly located vertically with relation to the reference point and through it to the flow-line the bar is adjusted horizontally in the bar holder to project outwardly in the direction of the trench a distance placing one pair of notches, usually the outermost ones, preferably precisely above the flow-line.

Hence when a series, usually at least three, of the instruments I1–I4 have been set up along a trench D excavated for reception of the pipes P and a cord C or other relatively weightless element tautly stretched along their respective bars 4 and seated in the appropriate notches 30, the field operatives can readily refer to the cord for proper location of pipes P using an ordinary plumb bob (not shown) suspended from any suitable support adjacent the cord to permit lateral location of a pipe with respect to the flow-line at that point and a grade pole G, comprising a graduated stick having at its lower end an arm *g* extending at right angles to it for insertion in the pipe bore to determine the depth of the pipe below cord C, this method usually affording accuracy, convenience and marked saving in labor greater than the methods presently in use.

As has been intimated it is desirable at least four instruments be utilized concurrently in any pipe laying operation since a minimum of three are required to permit a sighting to be made along them to detect possible errors in the survey data or in the locating of the bars and to enable a crew to place the fourth in position farther along the ditch than the three actually involved in the pipe laying at any moment. Thus after the pipe line has extended past instruments I1 and I2 of a series I1–I4, I1 can be lifted and moved beyond I4, to a position corresponding to I5, and cord C concurrently disconnected at I1 and connected to the instrument at I5. By thus leap-frogging the instruments continual sightings along the line of at least three of them can always be made and no interruption in the progressive laying of the pipe sections is occasioned by the necessity for location supports for cord C since these can be made ready for reception of the cord concurrently with but longitudinally in advance of the actual laying operations.

As the manholes are usually no more than 400′, and often less, apart, it is ordinarily feasible and desirable to provide a single length of cord sufficient to more than stretch between them so after its trailing portion is no longer required for sighting and is released, that part of the cord thus far unused is attached at I5, obviating releasing the cord from the intermediate instruments and moving it longitudinally as the work proceeds, the no longer needed portion being wound upon itself or upon a reel or the like for reuse beyond a subsequent manhole.

While I have herein described a preferred embodiment of the apparatus of my invention with reference to the drawing and explained the preferred practice of the method of the invention as facilitated by its use, I do not desire or intend to be limited or confined thereby or thereto in any way as changes and modifications in the form, structure, arrangement and relationship of the several components of the apparatus and in the several procedural steps described will readily occur to those skilled in the art and may be utilized if desired without departing from the spirit and scope of the invention.

Having thus described my invention, I claim and desire to protect by Letters Patent of the United States:

1. An instrument for locating a flow-line or the like comprising a stake having an end adapted to be driven into the ground to maintain the stake upright, a body slidable along the stake, releasable means for securing the body thereto, a bar holder pivotally secured to the body having a pair of depending arms constituting a yoke, opposed means carried by the arms for engaging the stake to releasably lock the holder in predetermined angular relation thereto, and a bar carried by and slidable in the holder projecting laterally outward therefrom and presenting a series of notches selectively adapted to receive an elongated relatively weightless element to support it in predetermined laterally offset relation to said stake for locating an arbitrary line below said element.

2. An instrument as defined in claim 1 in which the bar holder presents a way for reception of the bar, blocks bridge the way and locking elements are threaded into said blocks respectively for releasably locking the bar in said way.

3. An instrument as defined in claim 1 in which the bar holder includes spirit level for indicating the disposition of said holder with relation to the horizontal.

4. An instrument as defined in claim 1 in which the releasable means included in the body comprise screws threaded thereinto and engageable with the stake in a passage through the body into which the stake is entered.

References Cited

UNITED STATES PATENTS

| | | | |
|---|---|---|---|
| 854,916 | 5/1907 | Stoner | 33—86 |
| 2,343,688 | 3/1944 | Maxey | 33—207 |
| 2,535,722 | 12/1950 | Cooke | 33—207 X |
| 2,542,561 | 2/1951 | Olejniczak | 33—158 |
| 2,624,950 | 1/1953 | Mitchell. | |
| 2,632,954 | 3/1953 | Lieberman. | |
| 2,762,128 | 9/1956 | Whelan | 33—207 X |
| 3,171,210 | 3/1965 | Kundel | 33—86 |

WILLIAM D. MARTIN, JR., *Primary Examiner.*

U.S. Cl. X.R.

33—86, 207